United States Patent [19]
Davis et al.

[11] Patent Number: 5,706,314
[45] Date of Patent: *Jan. 6, 1998

[54] JOINT MAXIMUM LIKELIHOOD CHANNEL AND TIMING ERROR ESTIMATION

[75] Inventors: Mark Davis, Carlsbad; Long Huynh, San Diego, both of Calif.

[73] Assignee: Hughes Electronics, Los Angeles, Calif.

[*] Notice: The term of this patent shall not extend beyond the expiration date of Pat. No. 5,652,771.

[21] Appl. No.: 439,329

[22] Filed: May 11, 1995

Related U.S. Application Data

[63] Continuation-in-part of Ser. No. 368,529, Jan. 4, 1995.
[51] Int. Cl.⁶ .................................................. H04L 27/06
[52] U.S. Cl. ........................ 375/340; 375/344; 375/346; 375/368; 375/355; 370/514; 370/520; 348/537
[58] Field of Search ................. 370/100.1, 104.1, 370/105.1, 108, 105.4, 106; 375/229, 262, 266, 324, 340–346, 354, 355, 362, 365, 368; 348/500, 525, 528, 533, 536, 537

[56] References Cited

U.S. PATENT DOCUMENTS

| 5,233,632 | 8/1993 | Baum et al. | 375/344 |
| 5,276,706 | 1/1994 | Critchlow | 375/230 |
| 5,475,710 | 12/1995 | Ishizu et al. | 375/232 |

*Primary Examiner*—Stephen Chin
*Assistant Examiner*—Amanda T. Le
*Attorney, Agent, or Firm*—John T. Whelan; Wanda Denson-Low

[57] ABSTRACT

A system and method for jointly determining initial tap coefficients for a maximum likelihood sequence estimating equalizer and a timing error of an incoming signal, in one embodiment, receives the incoming signal into a receiver, and locates a known portion within a time frame of the incoming signal. The known portion is compared with a stored representation of the known portion, and with a stored representation of a derivative of the known portion. The initial tap coefficients and timing error of the incoming signal are jointly determined based on the comparing of the known portion with the stored representations, and a subsequent known portion is located within a subsequent time frame of the incoming signal based on the timing error. The initial tap coefficients are passed to a maximum likelihood sequence estimating equalizer.

13 Claims, 2 Drawing Sheets

JOINT MAXIMUM LIKELIHOOD CHANNEL AND TIMING ERROR ESTIMATION

This application is a continuation-in-part of U.S. patent application Ser. No. 08/368,529, entitled TIME TRACKING BASED ON A TAYLOR SERIES OF AN EXPECTED SIGNAL (Docket No. PDN-94041), filed Jan. 4, 1995, commonly assigned with the present application and incorporated herein by reference.

BACKGROUND OF THE INVENTION

The present invention relates to time tracking and channel estimation in a communications system, and more particularly to joint time tracking and channel estimation in a synchronous communications system. Even more particularly, the present invention relates to jointly determining a timing error, or clock phase error, of a clock signal and estimating a communications channel using maximum likelihood sequence estimation techniques.

Communication channels in the cellular environment commonly impose a combination of distorting effects on transmitted signals. Rayleigh fading, where a signal's perceived power level rises and falls rapidly over a wide range, results from the combination (interference) of signals that have traversed paths differing in length by at least a significant fraction of a wavelength (i.e., about 30 cm. for cellular). This type of interference is known as multi-path interference. Differences in path transmission times that approach the time taken to transmit a symbol result in a second problem called delay spread.

Delay spread results in reception of multiple delayed replicas of a transmitted signal. Each Rayleigh faded replica has randomly distributed amplitude and phase, and the rate at which this complex quantity varies is constrained by the Doppler bandwidth associated with a vehicle's speed, which is related to the velocity of, e.g., a mobile unit relative to a base station. In a frequency nonselective environment, the sampled outputs of a receiver's matched filter provide uncorrelated estimates of the transmitted data. As such, in terms of discrete time samples, the channel has exhibited an impulse response proportional to a delta function. With delay spread, on the other hand, the discrete time channel impulse response is extended to introduce energy at a number of symbol times. The effect of the channel on the transmitted signal, in turn, may be viewed as the convolution of the transmitted information with the channel's impulse response. The channel, therefore, emulates a convolutional coding process (encoder).

This leads to the possibility of estimating the transmitted information through the use of methods analogous to typical decoding of convolutional codes, i.e., maximum likelihood sequence estimation techniques. Unlike the more widely applied forward error correction decoding environment, the details of the encoding process in a reverse error correction decoding environment, are not known a priori by the receiver. Issues related to the need to estimate the form of the encoding process are addressed by this invention. Systems and methods are therefore needed in order to compensate and account for delay spread and Raleigh fading, as well as other communications-channel-related distortion. On approach to compensating for delay spread and Raleigh fading is shown in U.S. Pat. No. 5,263,026, commonly assigned with the present patent document and incorporated herein by reference, which teaches a maximum likelihood sequence estimating equalizer.

Another type of "error" that can affect the processing of an incoming radio frequency signal is timing error. Unlike delay spread and Raleigh fading, timing error involves errors in timing that occur between a clock at a transmitter an a supposedly synchronous clock at a receiver. A great deal has been published in the area of symbol time tracking, i.e., timing error determination. Namely, schemes employing early and late samples, oversampling, and interpolation have been used to adjust a timing offset, or clock phase error, in a clock circuit at the receiver. The need for such symbol time tracking schemes arises due to the fact that incoming radio frequency signals may be slightly delayed or advanced as a result of distortions that occur within a communications channel between the transmitter and the receiver, of relative physical movement between the transmitter and the receiver, or, perhaps primarily, of clock frequency mismatch between the transmitter and the receiver. As a result of such distortions, the clock circuit within the receiver must be adjusted so that it accurately tracks the timing of the incoming radio frequency signal. Systems and methods are therefore needed in order to make timing adjustments to the clock circuit so as to account for these distortions.

One approach to making these timing adjustments to the clock circuit utilizes three sets of samples that are taken from the incoming radio frequency signal. The first of these sets of samples is taken early, i.e., before the clock circuit indicates that such samples should be taken. A second set of such samples is taken on time, i.e., when the clock circuit indicates that such samples should be taken. And, a third set of samples are taken late, i.e., after the clock circuit indicates that such samples should be taken. After the three sets of samples are taken from the radio frequency signal, a comparison is made between a portion of each of the sets of samples, which is taken during a synch pattern portion of the incoming signal, and a representation of what these samples are expected to be. The synch pattern portion of the incoming signal contains a known pattern of information, and therefore should match the expected set of samples, after account is made for attenuation that occurs within the communications channel.

Based on the comparison, when the on time set of samples is highly correlated with the expected set of samples, the clock circuit is accurately tracking the incoming radio frequency signal. However, in the event the early set of samples is better correlated with the expected samples, a positive timing offset, or phase shift, is applied to the clock signal generated by the clock circuit so as to advance the timing of the clock signal. Similarly, in the event the late set of samples better correlates with the expected set of samples, a negative timing offset, or phase shift, is applied to the clock signal generated by the clock circuit so as to retard the timing of the clock signal. Thus, a timing offset adjustment is made to the clock signal, whenever the expected set of samples better correlates with the early or late set of samples. As a result, the clock signal will more accurately track the incoming radio frequency signal over time.

Early-late-type symbol time tracking provides for good adjustment of the clock signal based on variations in timing in the radio frequency signal. Unfortunately however, this approach requires that three sets of samples be taken from the radio frequency signal and that three separate correlations (comparisons) be performed between each of the sets of samples taken from the radio frequency signal and the expected set of samples. This additional sampling and correlating requires increased processing time and overhead at the receiver and limits the selection of prefabricated receiver hardware from which the receiver can be fabricated to that hardware which permits acquisition of the three sets of samples. Problematically, not all commercially available prefabricated receiver hardware makes available both on time samples and early and late samples. Therefore, improvements are needed in systems and methods for symbol time tracking in receivers.

Another approach to symbol time tracking utilizes oversampling, which involves sampling at a much higher rate than is needed for accurate symbol acquisition, i.e., a much higher rate than the Nyquist rate. Correlation techniques similar to those employed with early-late schemes are employed in oversampling schemes in order to select which of the several sets of samples provides the most appropriate representation of the incoming radio frequency signal.

A further approach to symbol time tracking is to sample the incoming radio frequency signal at the Nyquist rate and then to interpolate so as to generate off time samples, analogous to early and late samples. The interpolation approach thus involves not only performing correlations between the expected samples, and the interpolated samples but requires that the interpolated samples be generated.

An even further approach to symbol time tracking can be used when raw samples are passed through a filter, e.g., a matched filter, before symbol time tracking is performed. In this approach, time-offset reversions of the filter are used to generate early and late filtered samples from the raw samples. Unfortunately, this approach requires multiple filtering operations followed by the three sets of correlations required in the early-late symbol time tracking approach, described above.

Thus, the oversampling, interpolation, and filtered approaches to symbol time tracking suffer from the problems associated with the above-described early-late symbol time tracking scheme, namely, they require that additional samples be taken and/or that additional computations be performed. Thus, improvements are needed in systems and methods for symbol time tracking within a receiver.

The present invention advantageously addresses the above and other needs.

SUMMARY OF THE INVENTION

The present invention advantageously addresses the needs above as well as other needs by providing a system, and method for jointly determining a timing offset, or phase error, of a clock signal and for estimating characteristics of a communications channel.

In one embodiment, the invention can be characterized as a method of jointly determining initial channel taps for a maximum likelihood sequence estimating equalizer and an estimated timing offset of the incoming signal relative to a clock signal in a receiver. The method includes the steps of receiving the incoming signal into the receiver, and locating a known portion of the incoming signal within a time frame of the incoming signal in response to a clock signal generated within the receiver. The method further includes comparing the known portion with a stored representation of the known portion, and with a stored representation of a derivative of the known portion. These two comparisons can be characterized as comparing the known portion with a first order Taylor series. In one variation of this embodiment, the first of these two comparisons may be a subtraction and the second may be a multiplication. Numerous other types of comparisons may be conducted in other variations of this embodiment. In other embodiments, a higher order Taylor series may be compared with the known portion, e.g., the representation of the known portion and representations of first and second derivatives of the known portion may be compared with the known portion. Next, the method includes determining the initial channel taps and the estimated timing error of the incoming signal with respect to the clock signal in response to the comparing, and locating a subsequent known portion within a subsequent time frame of the incoming signal in response to the clock signal and the determined timing error. In this way, adjustment is made to the time relationship between the clock signal and the incoming signal so as to account for variations in timing that may occur in the incoming signal and/or clock signal.

In another embodiment, the invention can be characterized as a system comprising a clock circuit that generates a clock signal, and a receiver that receives an incoming signal with an unknown timing error relative to the clock signal. The incoming signal is divided into time frames, and each time frame includes a known portion. The system further includes course acquisition means for locating the known portion within a time frame in response to the clock signal, memory means, such as a read only memory (ROM), for storing a representation of the known portion, and for storing a representation of a derivative of the known portion, and processor means for comparing the known portion with the representation of the known portion, and for comparing the known portion with the representation of a derivative of the known portion. The system also further includes determining means for determining the initial channel taps and the estimated timing offset of the incoming signal with respect to the clock signal. The system additionally includes clock adjusting means for locating a subsequent known portion within a subsequent time frame of the incoming signal in response to the clock signal and in response to the timing error.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description of the presently contemplated best mode of practicing the invention is not to be taken in a limiting sense, but is made merely for the purpose of describing the general principles of the invention. The scope of the invention should be determined with reference to the claims.

The invention is useful in a system in which a signal passes from a transmitter through a communications channel and arrives at a receiver having been subjected to multipath interference (e.g., delay spread and Raleigh fading) and noise, and with an unknown time-varying delay. These distortions, i.e., multipath interference and timing error are introduced into the incoming signal by the communications channel or, in the case of timing error, as a result of discrepancies in timing between the transmitter and receiver.

Figure 3:
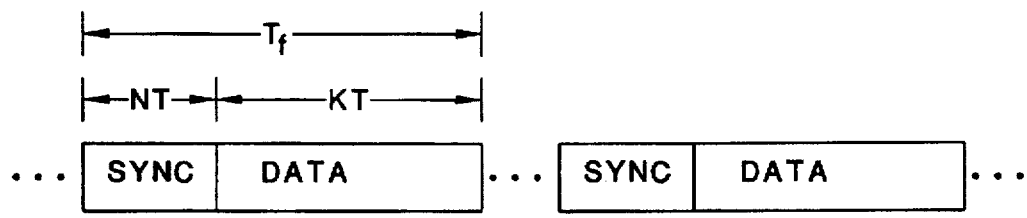
FIG. 3 is a representation of time frames of the incoming signal that are processed by the circuits of FIGS. 1 and 2.

The incoming signal consists of a known portion (or synch pattern) and an unknown portion. For example, the signal may be a digital signal divided into time frames, such as is illustrated in FIG. 3, having a known synchronization, or synch, pattern that precedes (or succeeds) an unknown data portion within each time frame. The time frames may be contiguous or may be discontinuous. Note that coarse acquisition of the locations of the known portion (or synch pattern) within the incoming signal is performed by heretofore known techniques, which, as mentioned below, are well known in the art.

In the following discussion, the noise introduced into the incoming signal by the communications channel is assumed to be uncorrelated at the sampling rate used to sample the incoming signal. To assume otherwise unnecessarily complicates the notation; the extension to colored noise will be briefly described below.

Figure 1:
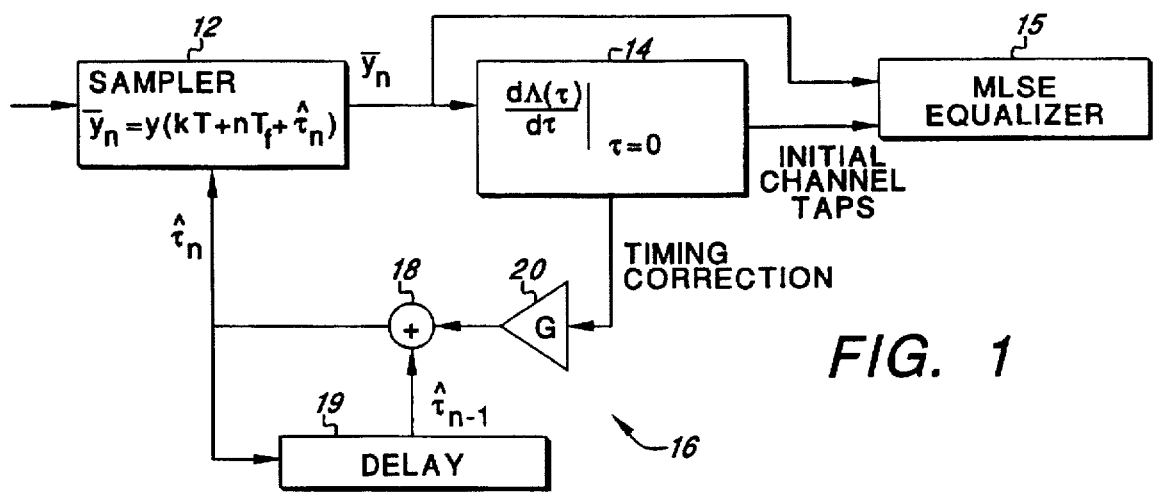
FIG. 1 is a functional block diagram showing the function components of one embodiment of the present invention.

Referring to FIG. 1, the waveform x(t) is to be received as the incoming signal y(t) after having been subjected to noise n and multipath interference within the communications channel. The receiver ideally samples y(t) at $\tau = \kappa T$, $\kappa \in \{0, \ldots, N-1\}$, but due to timing error $\tau$ such sampling is at $\tau = \kappa T + \tau$, wherein $\kappa$ is a sample number 0, 1, 2, 3, $\ldots$; $\tau$ is the timing error. Thus the incoming signal $y(\tau)$, having been sampled and including multipath interference, noise n and timing error $\tau$, i.e., the actual received samples, is $$y_k = w(kT + \tau_0) + n_k$$

where $\tau_0$ is timing error $\tau$ at t=0, $n_k$ is the noise having been sampled, and $$w(t) = \sum_{i=1}^{L} c_i x(t - \tau_i).$$

where L is the number of paths, each with path delay $\tau_i$ and amplitude $c_i$. In reality, the receiver knows neither the path delays $\tau_i$ nor the path amplitudes $c_i$. However, it is assumed herein that the path delays $\tau_i$ are known. In practice, the delays are arbitrarily fixed at the tap spacing of the accompanying maximum likelihood sequence estimating (MLSE) equalizer. For purposes of illustration, L=2, and $\tau_1=0$ and $\tau_2=T$.

The maximum likelihood estimate of $\tau_0$ based on the samples of the incoming signal $\{y_0 \ldots y_{N-1}\}$, denoted by $\hat{\tau}$, is defined as that value of $\tau$ which maximizes the density function of the samples $\{y_0 \ldots y_{N-1}\}$ given $\tau$.

The vector $\bar{x}(\tau)$ is defined as:

$$\bar{x}(\tau) = |x(\tau - \tau_i), x(T + \tau - \tau_i), \ldots, x((N-1)T_s + \tau - \tau_i)|^T.$$

The matrix $\bar{\bar{X}}(\tau)$ is defined as $|\bar{x}_1(\tau), \bar{x}_2(\tau), \ldots \bar{x}_L(\tau)|$.

The vector of tap coefficients is $\bar{c} = |c_1, c_2, \ldots, c_L|^T$. The vector $\bar{y}$ is defined as $|y_0 \ldots y_{N-1}|$. The vector $\bar{\rho}(\tau)$ is defined as $$\bar{\rho}(\tau) = \begin{vmatrix} <\bar{y}, \bar{x}_1(\tau)> \\ <\bar{y}, \bar{x}_2(\tau)> \\ \vdots \\ <\bar{y}, \bar{x}_L(\tau)> \end{vmatrix} \quad (1)$$

wherein $<\bar{a}, \bar{b}>$ denotes the inner product $\Sigma a_i b_i^*$, and $\|\bar{a}\|^2 = <\bar{a}, \bar{a}>$.

If the samples $n_k$ of the noise n are independent Gaussian variables of variance $\eta_0$, then the conditional density function of $\bar{y}$ is:

$$f(\bar{y}|\bar{c}, \tau) = \left(\frac{1}{2\pi\eta_0}\right)^{N/2} \exp\left\{ -\frac{1}{2\eta_0} \|\bar{y} - \bar{\bar{X}}(\tau)\bar{c}\|^2 \right\}. \quad (2)$$

To maximize the conditional density function, it is sufficient to minimize the above exponent. The expression can be maximized over $\bar{c}$ to yield a function only of $\tau$. By the orthogonality principle maximization, this is accomplished when $\bar{y} - \bar{\bar{X}}(\tau)\bar{c}$ is orthogonal to each column of $\bar{\bar{X}}(\tau)$, which leads directly to:

$$<\bar{y}, \bar{\bar{X}}(\tau)> = <\bar{\bar{X}}(\tau)\bar{c}, \bar{\bar{X}}(\tau)>, \quad (3)$$

where the "inner product" of a given vector with a given matrix is defined as the inner product of the vector with each column of the matrix. For example, $<\bar{y}, \bar{\bar{x}}(\tau)>$ is defined as the 1×L vector wherein a $j^{th}$ element is $<\bar{y}, \bar{x}_j(\tau)>$. The right side of Equation (3) is defined analogously. Transposition of both sides of Equation (3) yields the matrix equation:

$$\bar{c}(\tau) = (\bar{\bar{M}}(\tau))^{-1} \bar{\rho}(\tau) \quad (4)$$

where $\bar{\bar{M}}(\tau)$ is the L×L matrix $\bar{\bar{X}}^{*T}(\tau) \bar{\bar{X}}(\tau)$. The argument of $\bar{c}(\tau)$ signifies its dependence on the independent variable $\tau$, i.e., timing offset.

This matrix equation represents the most likely tap coefficients $\bar{c}$ at the timing error $\tau$. By substituting this matrix equation into the conditional density function of Equation (2), and taking the natural log, a likelihood ratio, as a function of timing offset $\tau$ is:

$$\begin{aligned} \max_{\bar{c}} \ln \; & [f(\bar{y}|\bar{c}, \tau)] \\ &= C_1 + \bar{\rho}^T(\tau)(\bar{\bar{M}}^{-1}(\tau))^* \bar{\rho}^*(\tau) \\ &\equiv \Lambda(\tau), \end{aligned} \quad (5)$$

where $C_1$ is a constant which may be discarded. (Note that $\bar{y}^T \bar{\bar{X}}^*(\tau) = \bar{\rho}^T(\tau)$ and that $\bar{\rho}^T(\tau) (\bar{\bar{M}}^{-1}(\tau))^* (\bar{\rho}^*(\tau)$ is real.

The statistic of interest is the derivative of the likelihood radio as a function of timing offset $\tau$, which is given by:

$$\left( \frac{d\Lambda(\tau)}{d\tau} \right)_{\tau=0} \quad (6)$$

When the two paths are spaced by the symbol time T, so that $\tau_1=0$ and $\tau_2=T$. The following are defined:

$$\rho(\tau) = <\bar{y}, \bar{x}_1(\tau)>$$

$$\rho_T(\tau) = <\bar{y}, \bar{x}_2(\tau)>$$

$$m(\tau) = \|\bar{x}_1(\tau)\|^2$$

$$m_T(\tau) = \|\bar{x}_2(\tau)\|^2$$

$$Q(\tau) = <\bar{x}_1(\tau), \bar{x}_2(\tau)>.$$

It follows that:

$$\begin{aligned} \bar{\rho}(\tau) &= \begin{matrix} \rho(\tau) \\ \rho_T(\tau) \end{matrix} \\ \bar{\bar{M}}(\tau) &= \begin{matrix} m(\tau) Q^*(\tau) \\ Q(\tau) m_T(\tau) \end{matrix} \end{aligned}$$

$$\Lambda(\tau) = \bar{p}^T(\tau)(\bar{M}^{-1}(\tau))^* \bar{p}^*(\tau) = \tag{7}$$

$$\frac{|p(\tau)|^2 m_T(\tau) + |p_T(\tau)|^2 m(\tau) - 2\Re\{Q^*(\tau)p(\tau)p_T^*(\tau)\}}{m(\tau)m_T(\tau) - |Q(\tau)|^2}.$$

If the numerator $N(\tau)$ and denominator $D(\tau)$ of Equation (7) are represented by a Taylor series about $\tau=0$, $$N(\tau)=N_0+\tau N_1+\ldots,$$

$$D(\tau)=D_0+\tau D_1+\ldots,$$

then $$\left(\frac{d\Lambda}{d\tau}\right)_{\tau=0} = \frac{D_0 N_1 - N_0 D_1}{D_0^2}. \tag{8}$$

For brevity of notation, the derivative vector of the sync pattern is defined as $$\bar{x}'_i(\tau) = \frac{d}{d\tau}(\bar{x}(\tau - \tau_i)),$$

and the following are also defined $$p_0 = <\bar{y}, \bar{x}_1(0)>,$$

$$p_T = <\bar{y}, \bar{x}_2(0)>,$$

$$p_0' = <\bar{y}, \bar{x}'_1(0)>,$$

$$p_T' = <\bar{y}, \bar{x}'_2(0)>, \tag{9}$$

Taylor series for each element of the numerator $N(\tau)$ and denominator $D(\tau)$ of Equation (7) are then derived as follows. For example, $$|p(\tau)|^2 = |<\bar{y}, \bar{x}_1(\tau)>|^2$$

$$= |<\bar{y}, \bar{x}_1(0) + \tau \bar{x}_1'(0) + \ldots>|^2$$

$$= |<\bar{y}, \bar{x}_1(0)> + \tau<\bar{y}, \bar{x}'_1(0)> + \ldots|^2$$

$$= |<\bar{y}, \bar{x}_1(0)>|^2 +$$

$$\tau 2\Re\{<\bar{y}, \bar{x}_1(0)><\bar{y}, \bar{x}'_1(0)>^*\} +$$

$$= |p_0|^2 + \tau 2\Re\{p_0 p_0'^*\} + \ldots$$

$$\equiv c_o + \tau c_1 + \ldots$$

Similarly, $$|p_T(\tau)|^2 = |p_T|^2 + \tau 2\Re\{p_T\ p_T'^*\} + \ldots \equiv c_{T0} + \tau c_{T1} + \ldots,$$

$$m(\tau) =$$

$$\|\bar{x}_1(0)\|^2 + \tau 2\Re\{<\bar{x}_1(0), \bar{x}_1'(0)>\} + \ldots \equiv m_0 + \tau m_1 + \ldots,$$

$$m_T(\tau) =$$

$$\|\bar{x}_2(0)\|^2 + \tau 2\Re\{<\bar{x}_2(0), \bar{x}_2'(0)>\} + \ldots \equiv m_{T0} + \tau m_{T1} + \ldots$$

$$Q(\tau) =$$

$$<\bar{x}_1(0), \bar{x}_2(0)> + \tau\{<\bar{x}_1(0), \bar{x}_2'(0)> + <\bar{x}_1'(0),$$

$$\bar{x}_2(0)\} \ (C \equiv Q_0 + \tau Q_1 + \ldots,$$

$$|Q(\tau)|^2 = |Q_0|^2 + \tau 2\Re\{Q_0 Q_1^*\} + \ldots \equiv Q_{20} + \tau Q_{21} + \ldots,$$

$$2\Re\{Q^*(\tau)p(\tau)p_T^*(\tau)\} =$$

$$2\Re\{Q_0^* p_0 p_T^*\} + \tau 2\Re\{Q_0^* p_0 p'_T^* + Q_0^* p'_0 p_T^* + Q_1^* p_0 p_T^*\} + Q \equiv P_0 + \tau P_1 + \ldots$$

The Taylor series coefficients of the numerator, $N(\tau)$, and denominator, $D(\tau)$, of Equation (7) can then be expressed in terms of the above definitions, as $$N_0 = c_0 m_{T0} + c_{T0} m_0 - P_0$$

$$N_1 = c_0 m_{T1} + c_1 m_{T0} + C_{T0} m_1 + c_{T1} m_0 - P_1$$

$$D_0 = m_0 m_{T0} - Q_{20}$$

$$D_1 = m_0 m_{T1} + m_1 m_{T0} - Q_{21}$$

where $$Q_{20} = |Q_0|^2$$

$$Q_{21} = 2\Re\{Q_0 Q_1^*\}$$

$$Q_0 = <\bar{x}_1(0), \bar{x}_2(0)>$$

$$Q_1 = \{<\bar{x}_1(0), \bar{x}'_2(0)> + <\bar{x}_2(0), \bar{x}'_1(0)>\}$$

and $$m_{T0} = \|\bar{x}_2(0)\|^2$$

$$m_0 = \|\bar{x}_1(0)\|^2$$

$$c_{T0} = |p_T|^2$$

$$p_0 = 2\Re\{Q_0^* p_0 p_T^*\}$$

$$m_{T1} = 2\Re\{<\bar{x}_2(0), \bar{x}'_2(0)>\}$$

$$m_1 = 2\Re\{<\bar{x}_1(0), \bar{x}'_1(0)>\}$$

$$c_{T1} = 2\Re\{p_T p'_T^*\}$$

$$p_1 = 2\Re\{Q_0^* p_0 p'_T^* + Q_0^* p'_0 p_T^* + Q_1^* p_0 p_T^*\}$$

From Equation (8), $$\left(\frac{d\Lambda(\tau)}{d\tau}\right)_{\tau=0} = \frac{1}{(m_0 m_{T0} - Q_{20})^2} \times \tag{20}$$

$$\{(m_0 m_{T0} - Q_{20})(c_0 m_{T1} + c_1 m_{T0} + c_{T0} m_1 + c_{T1} m_0 - P_1) -$$

$$(c_0 m_{T0} + c_{T0} m_0 - P_0)(m_0 m_{T1} + m_1 m_{T0} - Q_{21})\}.$$

Many elements of the above are constants depending on only the synch pattern. Since a scaling of the incoming signal $y(\tau)$ is preferably applied before time tracking is performed, the derivative determined above only has to be proportional to the actual derivative, which further simplifies computation. The only real-time inner products that need to be computed are the four in Equation (9).

FIG. 1 illustrates how the invention operates in a receiver such as is used in a receive channel of a cellular telephone. Such receive channels and such cellular telephones are well known by those skilled in the art and are therefore not described herein in detail. The incoming signal $y(t+\tau)$ is to be sampled by a sampler 12 (or analog to digital converter) ideally at a sampling period $kT+\tau$, where the timing error $\tau$ is unknown. A set of T-spaced samples $Y_n$ are taken each T seconds, where T is the frame time, mentioned above, such as illustrated in FIG. 3. The sampling period $kT+\tau$ for a cellular telephone could be, for example, about one or two periods per symbol. Timing for such sampling is initially based on coarse acquisition of the location of a synch pattern portion $N_T$ within time frames of the incoming signal. Such coarse acquisition is known in the art and is therefore not described herein in detail. The constant synch portion $N_T$ of the signal is present at a known location pattern in each time frame. The samples occurring during this constant synch pattern portion of the signal are fed into a joint maximum likelihood channel estimator and timing error estimator 14, which performs the calculations of Equation (10). The joint maximum likelihood estimator and timing error estimator 14 generates a timing correction signal, as well as initial channel tap estimates $\bar{c}$ for a maximum likelihood sequence estimating equalizer 15, as is shown in U.S. Pat. No. 5,263,026, issued to Parr, et al., and incorporated herein by reference. Note that the magnitude of the timing correction signal $\Delta\tau$ is dependent on the incoming signal $y(\tau)$ magnitude, and thus should be normalized by the signal's strength if it is not constant. Techniques for performing such amplitude normalization are well known in the art and are therefore not described herein in detail.

The timing correction signal $\Delta_\tau$ is filtered by an infinite impulse response filter (IIR) so as to achieve an appropriate tradeoff between response time and jitter (as dictated by the system in which the present invention is utilized). The IIR filter employs an amplifier 20, which multiplies the timing error signal $\Delta_\tau$ by a gain G; an adder 18 with an output and first and second positive inputs; and a delay loop formed between the output of the adder 18 and the second positive input. An amplified timing correction signal $G\Delta_\tau$ is passed from the amplifier 20 to the adder 18, which adds the estimated timing error $\hat{\tau}_n$, having been delayed by one time frame, to the amplified timing correction signal $G\Delta_\tau$. The adder 18 generates an updated estimated timing error $\hat{\tau}_{n+1}$ in response to such adding. Thus, the updated estimated timing error $\hat{\tau}_{n+1}$ is generated by the IIR filter and is defined as follows:

$$\hat{\tau}_{n+1} = \tau_n + G\Delta_\tau.$$

As the sampler 12 samples the incoming signal y(t), fine adjustments are made to the time at which the sampling occurs in response to the estimated timing error $\rho(\tau)$ in order to account for clock phase error, or timing error, that occurs between the incoming signal y(t) and the clock signal generated by the clock circuit in the receiver. Thus, sampling occurs periodically at $t=kT+\hat{\tau}(t)$, wherein k is the sample number 0, 1, 2, 3, . . . ; T is the sampling interval, or frame time, mentioned above; and $\hat{\tau}(t)$ is the estimated timing offset described above, as a function of time t. The timing $kT+\hat{\tau}(t)$ of the sampling is controlled by the clock circuit, such as are commonly used in the art, which is periodically adjusted as $\hat{\tau}(t)$ is adjusted in response to the timing correction signal $\Delta\tau$. The initial coarse acquisition determines $\hat{\tau}(0)$.

Several assumptions are made in the analysis above, which for a cellular telephone-type communications system are reasonable assumptions. First, approximately every $T_{synch}$ seconds following the initial acquisition of the synch pattern, it is assumed that there is another synch pattern. Second, at t=0, $\tau(t)$ is assumed to be less than a maximum timing variation $\epsilon$, so as to model coarse acquisition operation, which is assumed to have been performed previously. Third, after t=0, the actual timing error $\tau(t)$ is sufficiently small that it can be tracked by adjusting the clock signal phase or estimated timing error $\hat{\tau}(t)$ once every $T_{synch}$ seconds. Fourth, the goal of the sampler (analog-to-digital converter) is to form the samples y(kT), which implies that the estimated timing error $\hat{\tau}(t)$ is very close to the actual timing error $\tau(t)$. In the event the estimated timing error $\hat{\tau}(t)$ is equal to the actual timing error $\tau(t)$, then the sampler will generate the perfectly timed samples y(kT).

In the case wherein noise is correlated at the sampling rate kT, such as might arise if thermal noise is present at the input, but this noise is filtered by a system matched filter $H(\omega)$ before being sampled, circuit and quantization noises are approximately uncorrelated, and so the noise in the samples y(kT) (denote this noise by n(kT)) can be reasonably modeled as a discrete time process with an autocorrelation function:

$$E[n(kT)n(lT)]=h_2((k-1)T)+n_0 \quad (11)$$

where $h_2(t)$ is the inverse Fourier transform of $|H(\omega)|^2$, and $n_0$ is a constant modeling uncorrelated circuit and quantization noises. If $\bar{\bar{N}}$ is a Toeplitz Hermitian matrix with the $\{k,l\}^{th}$ element is given in Equation (11), then the exponent in Equation (2) is instead $$-(\bar{y}-\bar{\bar{X}}(\tau)\bar{c})\bar{\bar{N}}^{-1}(\bar{y}-\bar{\bar{X}}(\tau)\bar{c})^* \quad (12)$$

Following the same development as described above, one skilled in the art will recognize that this result can be computed without any additional real-time burden beyond that required by the white-noise case.

Another variant of the above-described embodiment is to do separate rather than joint estimation of the channel taps and timing error. This results in a slightly simpler form: If the channel tap estimate is treated as a constant, assuming 0 timing error, then Equation (6) becomes $$\bar{c}=(\bar{\bar{M}}(0))^{-1}\bar{p}(0)$$

The log likelihood ratio is then proportional to $$\ln \Lambda(\bar{y}|\tau)-\|\bar{y}-\bar{\bar{X}}(\tau)\bar{c}\|^2.$$

so that $$\left(\frac{d\Lambda}{d\tau}\right)_{\tau=0} = -2\Re\{\bar{y}^H \bar{\bar{X}}' \bar{c}\} + \bar{c}^H (\bar{\bar{X}}^H (\bar{\bar{X}} + \bar{\bar{X}}^H \bar{\bar{X}}')\bar{c},$$

where $\bar{\bar{X}}$ is an abbreviation for $\bar{\bar{X}}(0)$ and $\bar{\bar{X}}'$ is $|\bar{x}_1(0), \ldots \bar{x}_L(0)|$. The superscripted "H" denotes a hermitian form matrix.

It was stated previously that Equation (6) must be normalized by the incoming signal strength to yield the correct gain. Another variant of the present embodiment is to estimate the time offset at a the minimum of a parabola matching the likelihood ratio in first and second derivative at a given sample point. That is, $$\hat{\tau} = \frac{\Lambda'(0)}{\Lambda''(0)}$$

where time differentiation is noted as a prime, so that for example $\Lambda'(0)$ is proper notation for Equation (6). This can be found as before by expanding the numerator and denominator in a Taylor series, so that Equation (8) becomes instead $$\hat{\tau} = \frac{D_0^2 N_1 - N_0 D_0 D_1}{2N_2 D_0^2 - 2N_1 D_0 D_1 + 2N_0 D_1^2 - 2N_0 D_0 D_2}$$

where $N_i$ and $D_i$ are the $i^{th}$ Taylor series coefficients of the numerator and denominator of $\Lambda(\tau)$, given for example by Equation (7).

The present embodiment determines a timing error, or clock phase error, of the incoming signal $y(t+\tau)$, e.g., during a particular time frame $T_f$. In the above embodiment, this determination is made by making two comparisons: comparing (or correlating) the known portion of the signal as received into the receiver (referred to as the received known portion, or received synch pattern) to the known portion of the signal that was expected (referred to as the expected known portion, or expected synch pattern); and comparing the known portion of the signal that is received into the receiver to the derivative of the known portion of the signal that was expected (expected derivative). These comparisons are made by the maximum likelihood channel estimator and timing error estimator 14 during the computation of, for example, Equation (9). Both the expected known portion and the expected derivative can be stored in a memory, such as a read only memory (ROM), and are constant. Thus, the only input needed by the invention is the received known portion of the incoming signal. The expected known portion and the expected derivative, together form a first order Taylor series. A higher order Taylor series may be used requiring that additional comparisons be performed. Use of the first order Taylor series is however, preferred.

Advantageously, the above-described embodiment of the invention requires only one set of sparsely spaced samples within the known portion of the incoming signal in order to determine both initial maximum likelihood channel estimates and the timing error-unlike heretofore known techniques, which require an independent determination of timing error involving either additional samples of the signal or approximations of such samples, both of which require separate and additional processing steps.

The invention is widely applicable to communications systems, and digital communications systems in particular. The invention is applicable in any system in which a known synchronization pattern is periodically transmitted through a communications channel to a receiver. In a cellular telecommunications system, for example, the communications channel will typically include air, but it should be understood that the present invention may be applied to systems wherein the communications channel includes any known medium for transmitting communication signals, e.g., wire pairs, coaxial cable, wave guides, fiber optical cable and the like. Timing variations in the incoming signal must be slow enough that the synch patterns within the signal can be tracked. Specifically, there should be an insignificant time variation within the synch patterns, and variations in timing between synch patterns should be small. The amount of timing variation between synch patterns that is acceptable will depend on many known factors that are a function of the particular application in which the invention is utilized.

Figure 2:
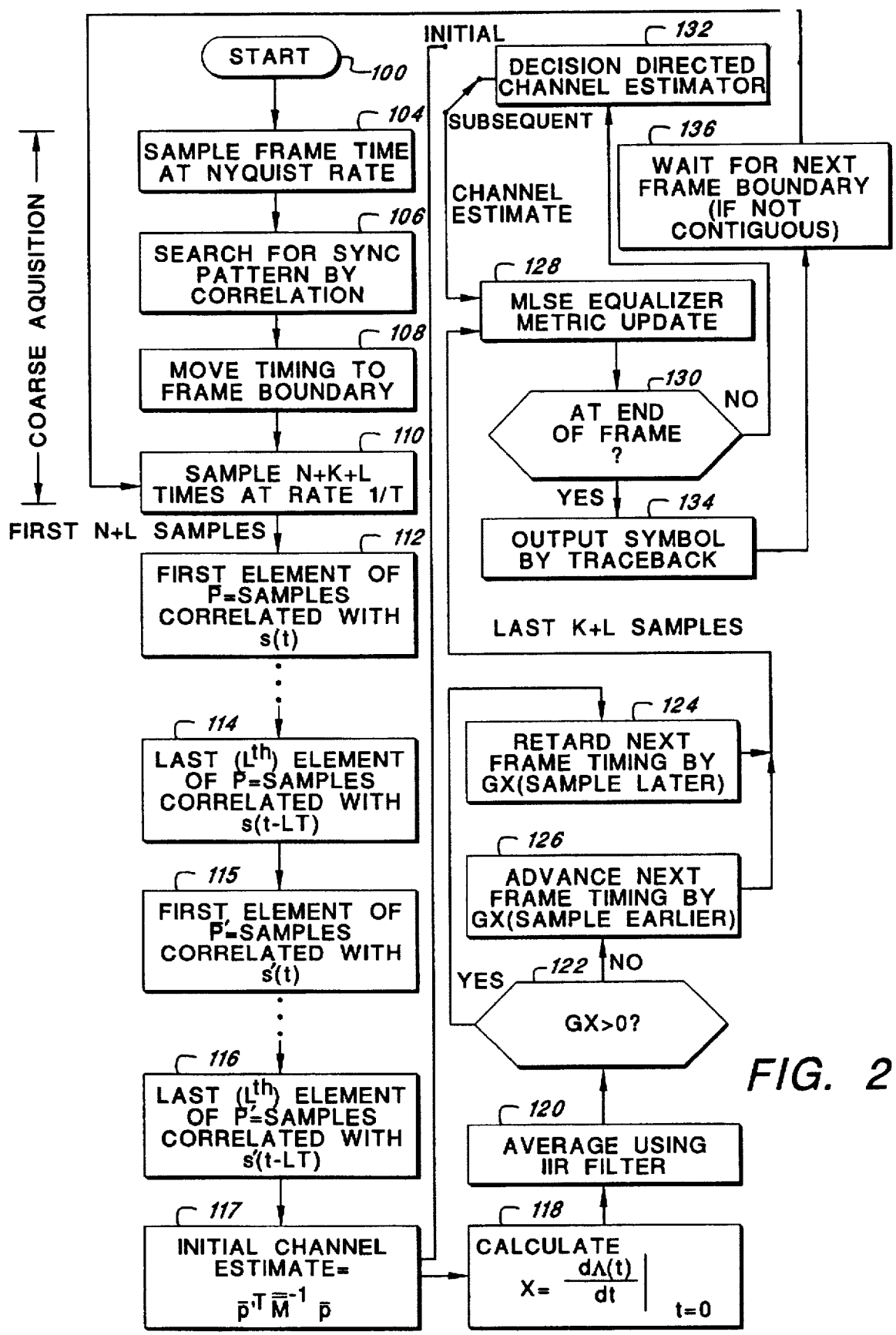
FIG. 2 is a flow chart showing the steps traversed by the embodiment of FIG. 1 in order to carry out the one embodiment.

Referring next to FIG. 2, a flow chart is shown of the steps traversed in order to carry out the determination of timing error in FIG. 1. It will be recognized by one skilled in the art that the teachings herein can be at least partially implemented using a processor, e.g., a digital microprocessor, modified with an appropriate software program. Such a software program could easily be generated by one skilled in the art based on the teachings herein, and in particular based on the flow chart of FIG. 2.

To begin (Block 100), a baseband waveform (generated in response to a downconversion of the incoming communications signal) is normalized (not shown) in amplitude using, e.g., an automatic gain controlled amplifier. The incoming signal y(t) is generated by the automatic gain controlled amplifier, and is frame time sampled (Block 104) at the Nyquist sampling rate. Based on this frame time sampling, a search is conducted (Block 106) for the synch pattern, by correlating the frame time samples with the expected (known) synch pattern. Once the portion of the incoming signal is located in which the synch pattern is found, the clock circuit is synchronized (Block 108) with the incoming signal. The sampling (Block 104), search (Block 106) and synchronization (Block 108) steps are referred to generally as coarse acquisition, and are well known in the art of synchronous communications.

Next, the incoming signal is sampled (Block 110) at a sampling rate 1/T (which is a slower sampling rate than the frame time sampling rate used for coarse acquisition). The timing of the sampling and the sampling rate 1/T are controlled in response to the clock signal generated by the clock circuit (not shown) within the receiver. Such clock circuits are well known in the art. For the first $N_T$ samples, which are defined as occurring during the synch pattern portion of the incoming signal, the expected samples S(t) of the synch pattern portion are compared (Blocks 112 to 114) to the received synch pattern S(t) by subtracting the expected synch pattern from the received synch pattern. Next, the result of the subtraction is correlated (Blocks 114 and 116) with the derivative of the expected synch pattern. Based on these correlations, the maximum likelihood channel estimator and timing offset estimator 14 estimates (Block 117) the initial channel taps and passes them to the maximum likelihood sequence estimating equalizer 15. Also based on these correlations, the maximum likelihood channel estimator and timing offset estimator 14 generates a timing correction signal $A_\tau$ (Block 118). The timing correction signal is passed to the infinite impulse response filter where it is multiplied, i.e., amplified, (Block 120) by the gain G. The amplified timing connection signal $GA_\tau$ generated by the amplifier and is averaged with a previously estimated timing error $\hat{T}(t)$. In response to such averaging, the timing error $\hat{T}(t+1)$ is updated and is evaluated to determine (Block 122) whether the estimated timing error $\hat{T}(t+1)$ is positive. If the estimated timing error $\hat{T}(t+1)$ is not positive (Block 122), sampling is too early so the clock signal is retarded (Block 124), i.e., delayed, because the synch pattern indicates that the estimated timing error $\hat{T}(t+1)$, or phase error, is positive. If the estimated timing error $\hat{T}(t+1)$ is greater than zero (Block 122), sampling is too late so the clock signal is advanced (Block 126), because the synch pattern indicates that the estimated timing error $\hat{T}(t+1)$, or phase error, is negative.

Following the synch pattern, i.e., the first $N_T$ samples, are the information-containing, or data, samples, i.e., the next $K_T$ samples. Based on each of these information containing samples, the MLSE equalizer performs a metric update, as is known in the art (Block 128). After the MLSE metric is updated, determination is made (Block 130) of whether the end of a frame has been reached, and if the end of the frame has not been reached, the channel estimates c are updated (Block 132) and the next sample is used to update the MLSE metric (Block 128) etc. When the end of the frame is reached, the present embodiment, which preferably utilizes an MLSE equalizer that stores received symbol information using a trellis approach, traces back the trellis in order to make output symbol decisions (Block 134), and then waits (Blocks 136) for the beginning of the next frame (if the frames are not contiguous). This processes is repeated for each frame of the incoming signal.

In this way the maximum likelihood channel estimator and timing offset estimator 14 generates MLSE channel tap estimates for each frame and sends these estimates to the MLSE equalizer. In addition, the maximum likelihood channel estimator and timing offset estimator 14 jointly estimates the timing error, or clock phase error, and updates (or adjusts) the clock signal generated by the clock circuit in response thereto. Because the initial channel tap estimates and the estimates timing error are jointly generated by the maximum likelihood channel estimator and timing offset estimator 14, increased processing speed and efficiency are possible. Such estimates are generated without the need for additional sets of samples from the incoming signal to be taken or estimated.

While the invention herein disclosed has been described by means of specific embodiments and applications thereof, numerous modifications and variations could be made thereto by those skilled in the art without departing from the scope of the invention set forth in the claims.

What is claimed is:

1. In a system in which an incoming signal is received into a receiver with unknown multipath interference and timing error, the incoming signal being divided into time frames, and each time frame including a known portion, a method of jointly determining an initial channel tap estimate for a maximum likelihood sequence estimating equalizer and a timing error of the incoming signal, the method comprising:

receiving the incoming signal into the receiver;

locating the known portion within a time frame of the incoming signal in response to a clock signal generated within the receiver;

comparing the known portion having been located with a stored representation of the known portion;

comparing the known portion having been located with a stored representation of a derivative of the known portion;

determining jointly, the initial channel tap estimates and the timing error of the incoming signal with respect to the clock signal in response to the comparing with the stored representation of the known portion and the comparing with the stored representation of the derivative of the known portion; and locating a subsequent known portion within a subsequent time frame of the incoming signal in response to the clock signal generated within the receiver and in response to the timing error having been determined.

2. The method of claim 1 including filtering the timing error having been determined using an infinite impulse response filter.

3. The method of claim 1 wherein said locating of said subsequent known portion includes:

advancing said clock signal in the event said timing error is positive; and retarding said clock signal in the event said timing error is negative.

4. The method of claim 1 wherein said locating of said known portion within said time frame of said incoming signal includes locating a synch pattern within said time frame of said incoming signal, and wherein said locating of said subsequent known portion within said subsequent time frame of said incoming signal includes locating a subsequent synch pattern within said subsequent time frame of said incoming signal.

5. The method of claim 4 wherein said receiving of said incoming signal includes receiving a remainder portion of said incoming signal within said time frame of said incoming signal.

6. The method of claim 5 further comprising:

transmitting, before said receiving of said incoming signal into said receiver, said incoming signal through a communications channel from a transmitter to said receiver.

7. The method of claim 6 wherein said transmitting includes transmitting said known portion during said time frame of said incoming signal and transmitting said subsequent known portion during said subsequent time frame of said incoming signal, said known portion of said incoming signal and said subsequent known portion of said incoming signal being transmitted as substantially identical portions of said incoming signal.

8. The method of claim 7 further comprising:

distorting, before said receiving of said incoming signal into said receiver, said incoming signal using said communications channel.

9. The method of claim 8 wherein said transmitting includes transmitting said incoming signal through air.

10. The method of claim 9 further comprising:

demodulating said remainder portion of said incoming signal.

11. The method of claim 5 including:

communicating the initial channel tap estimates to a maximum likelihood sequence estimating equalizer.

12. The method of claim 1 wherein said determining, jointly, said initial channel tap estimates and said timing error includes determining $$\left( \frac{d\Lambda(\tau)}{d\tau} \right)_{\tau=0},$$

wherein $\Lambda(\tau)$ is a likelihood ratio and $\tau$ is said timing error in said incoming signal relative to said clock signal.

13. In a system comprising a clock circuit that generates a clock signal, and a receiver that receives an incoming signal with multipath interference and an unknown timing error relative to the clock signal, the incoming signal being divided into time frames, and each time frame including a known portion, an improvement comprising:

coarse acquisition means for locating the known portion within a time frame of the incoming signal, the locating means being coupled to the clock circuit and the locating being in response to the clock signal generated by the clock circuit;

memory means for storing a representation of the known portion, and for storing a representation of a derivative of the known portion;

processor means coupled to the coarse acquisition means and to the memory means, the processor means being for comparing the known portion, having been located by the coarse acquisition means, with the representation of the known portion, and for comparing the known portion, having been located by the coarse acquisition means, with a stored representation of a derivative of the known portion;

determining means for jointly determining initial tap coefficients for a maximum likelihood sequence estimating equalizer and the timing error of the incoming signal with respect to the clock signal in response to the processor means; and clock adjusting means for locating a subsequent known portion within a subsequent time frame of the incoming signal in response to the clock signal generated by the clock circuit and in response to the timing error having been determined by the determining means.

* * * * *